T. J. FAY.
APPARATUS FOR CAMBERING AND QUENCHING METAL.
APPLICATION FILED AUG. 19, 1914.
1,267,530.
Patented May 28, 1918.
5 SHEETS—SHEET 3.
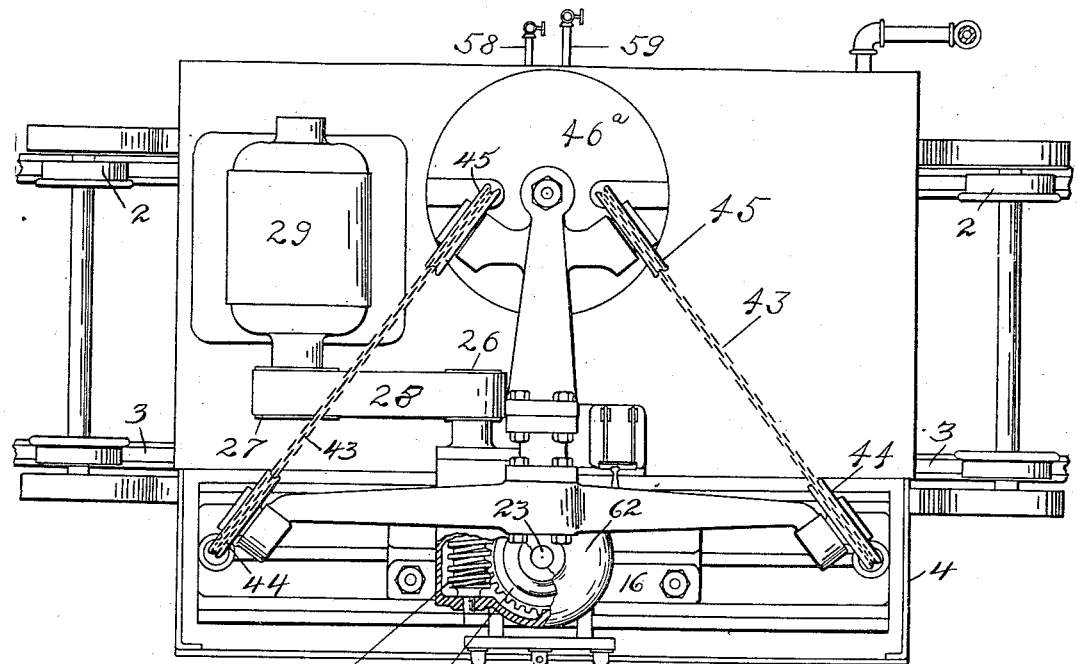
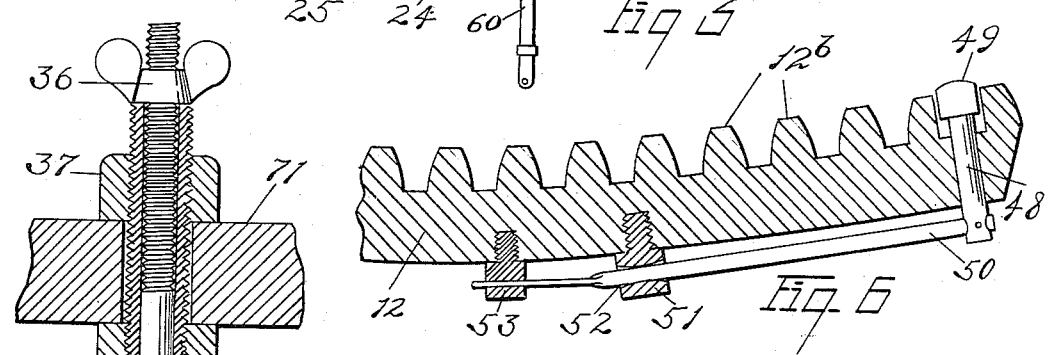
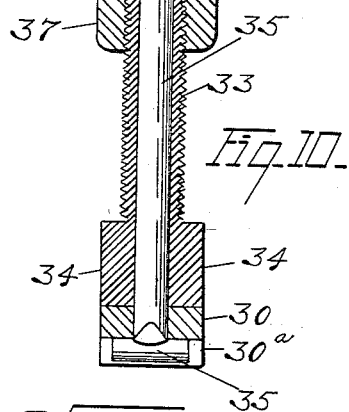
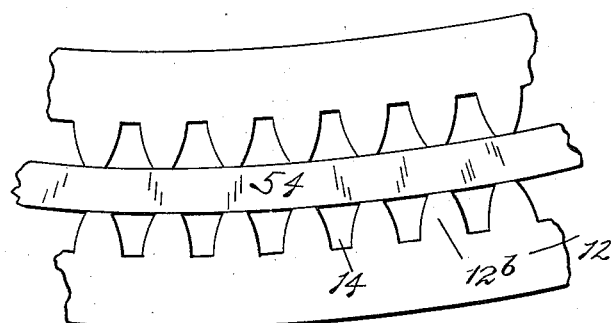

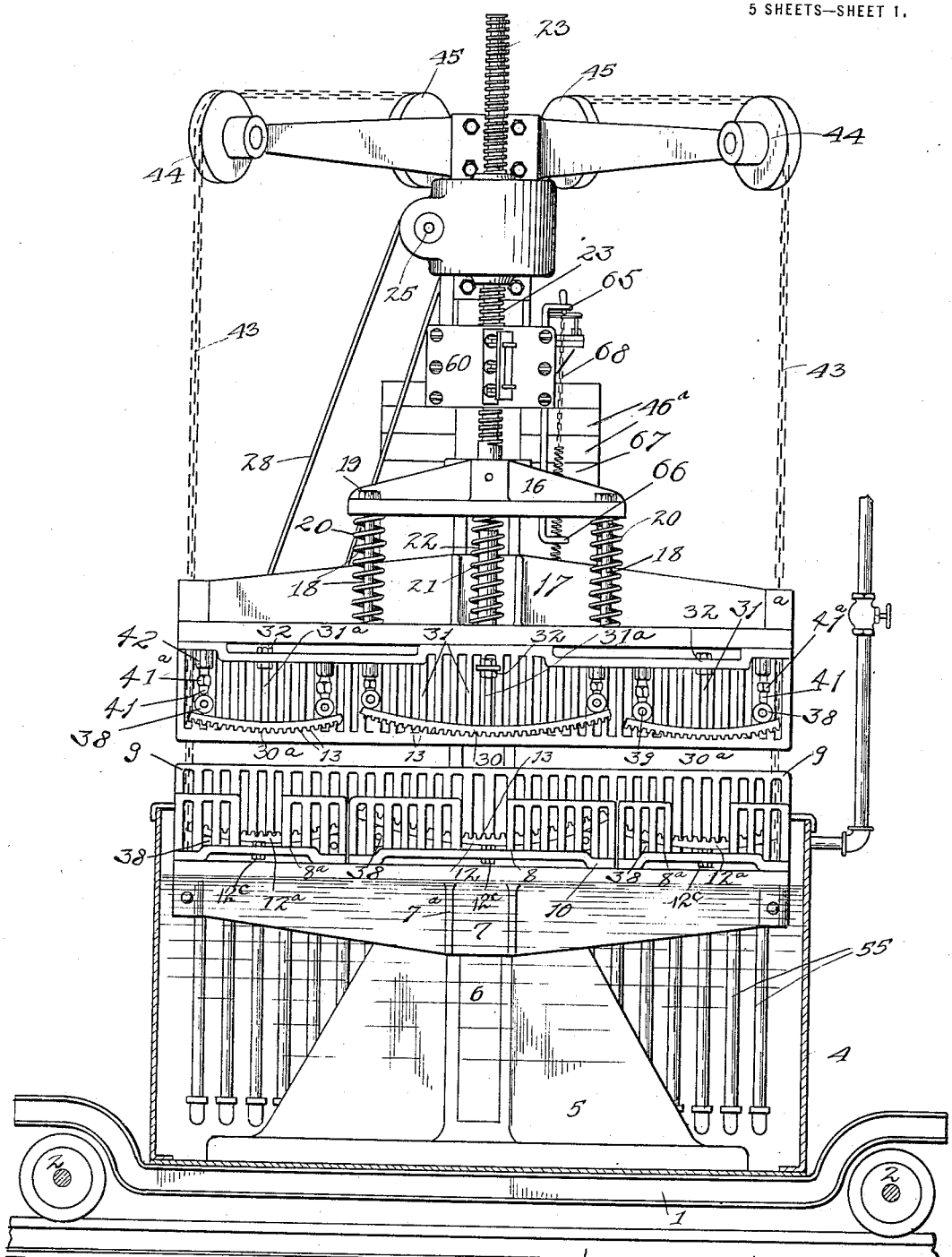

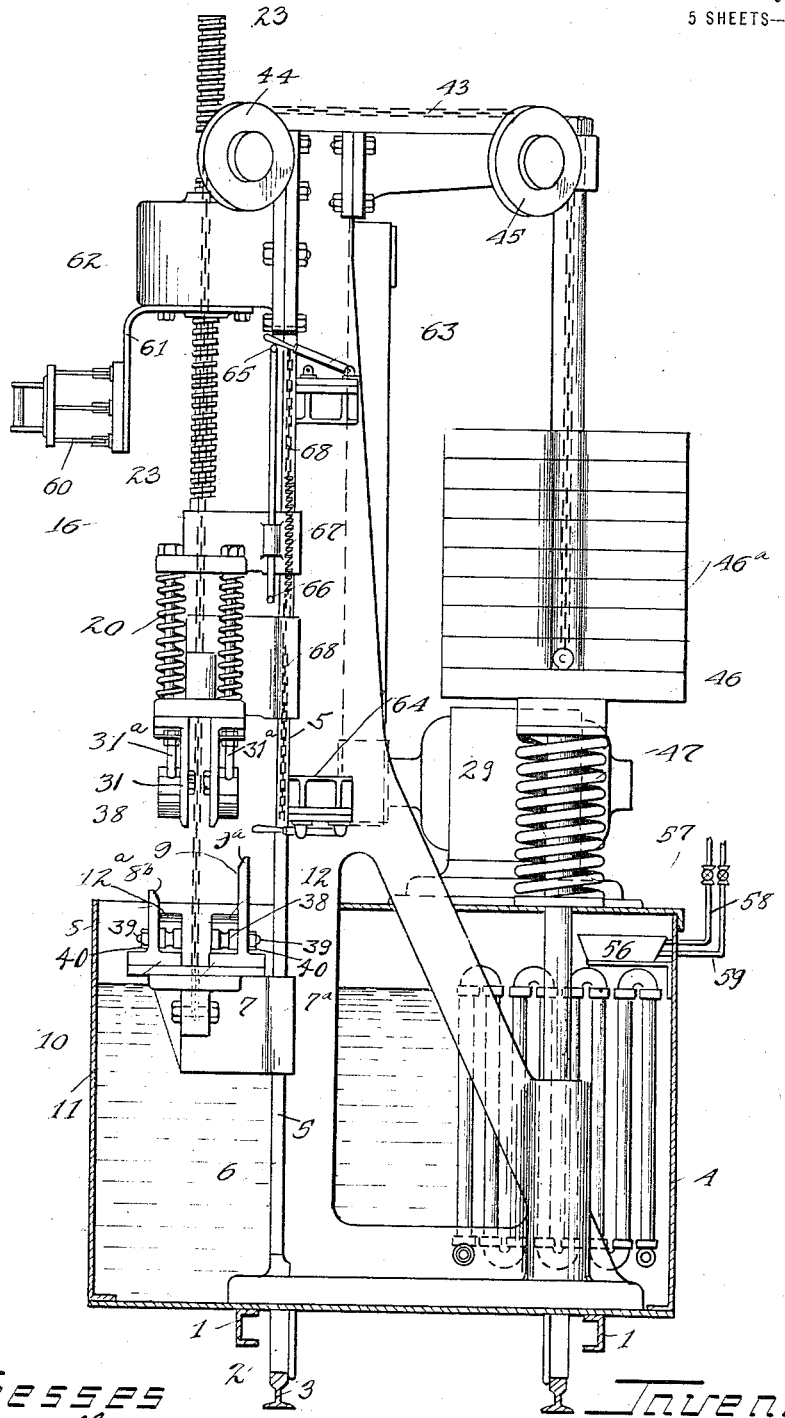

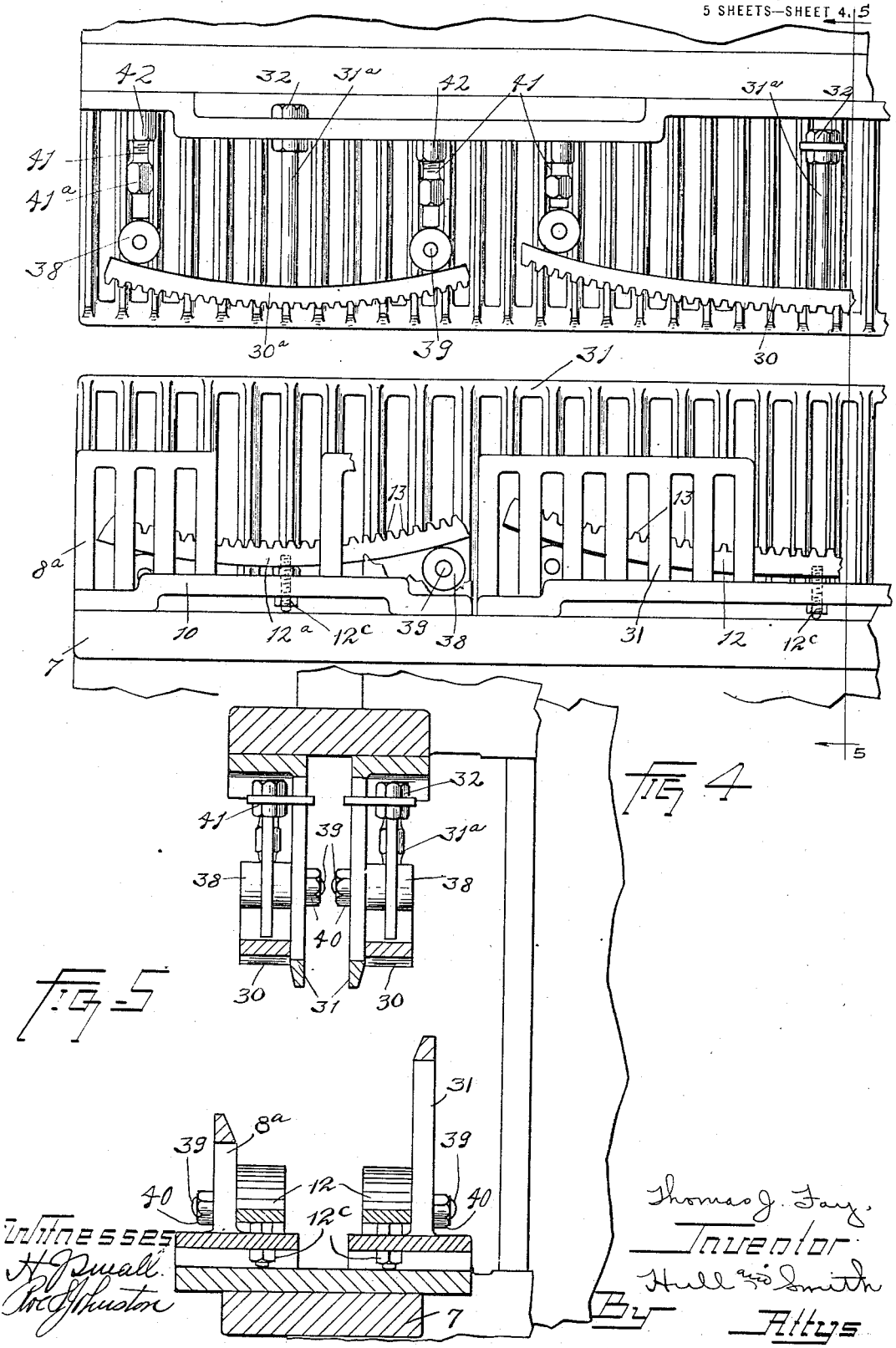

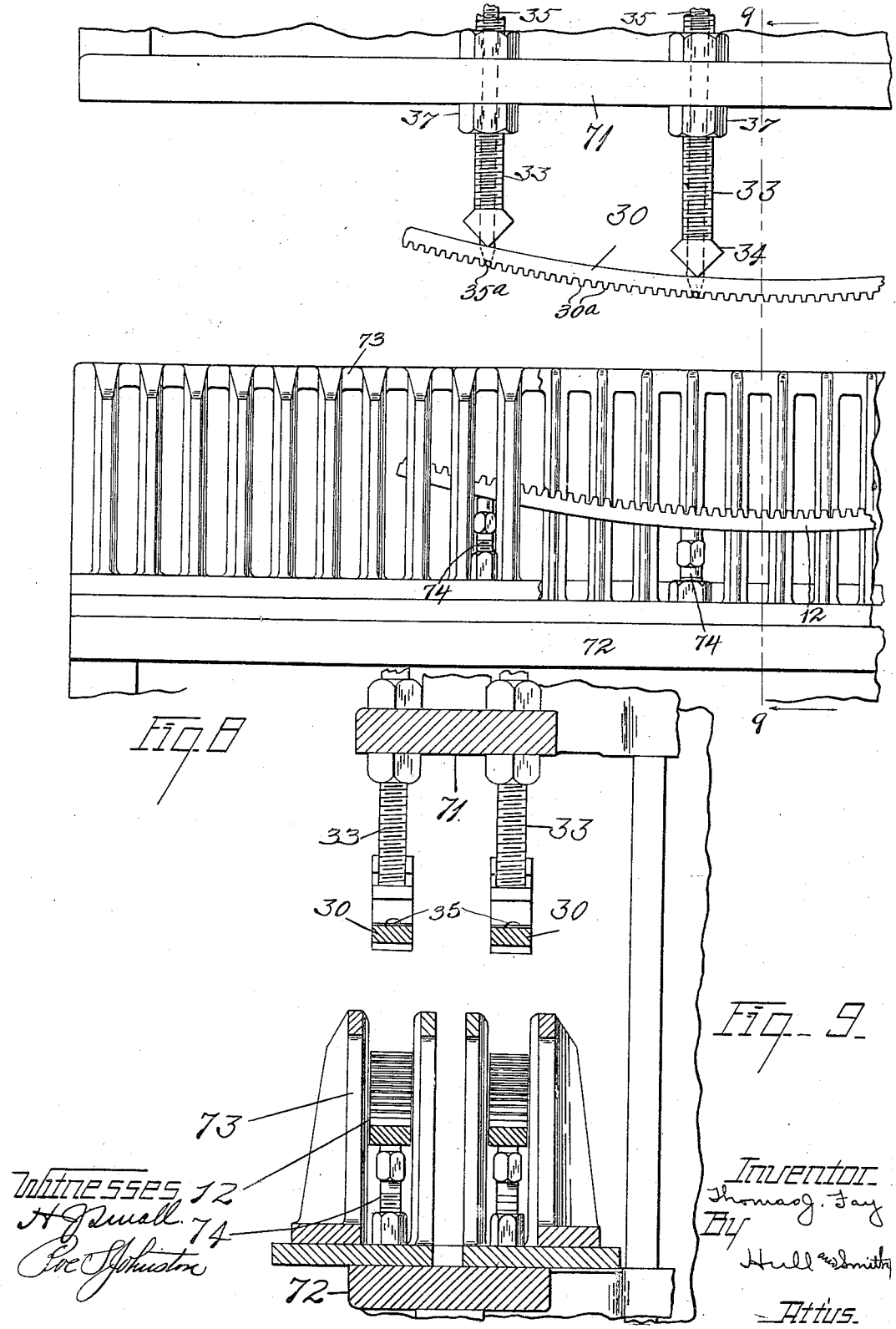

UNITED STATES PATENT OFFICE.

THOMAS J. FAY, OF BROOKLYN, NEW YORK, ASSIGNOR, BY MESNE ASSIGNMENTS, TO THE STANDARD PARTS COMPANY, OF CLEVELAND, OHIO, A CORPORATION OF OHIO.

APPARATUS FOR CAMBERING AND QUENCHING METAL.

1,267,530.             Specification of Letters Patent.      Patented May 28, 1918.

Application filed August 19, 1914. Serial No. 857,522.

*To all whom it may concern:*

Be it known that I, THOMAS J. FAY, a citizen of the United States, residing at Brooklyn in the county of Kings and State of New York, have invented a certain new and useful Improvement in Apparatus for Cambering and Quenching Metal, of which the following is a full, clear, and exact description, reference being had to the accompanying drawings.

This invention relates to a machine or apparatus for cambering and quenching metal and particularly plates of the character used in spring construction. It is the general purpose of the invention to provide an apparatus whereby the cambering and quenching of plates may be secured in an extremely efficient and rapid manner, the particular apparatus shown herein being adapted for use in the "unit system" disclosed in my application No. 857,025, filed August 17, 1914. In the operation of my apparatus I realize a process for the heat treatment of metal plates whereby the cambering and quenching are not only effected in a speedy and efficient manner but the quality of the tempered plates is greatly improved over that of plates cambered and quenched by other methods with which I am familiar. This process constitutes the subject matter of a separate application, including the subject matter set forth herein. Further and more limited objects of the invention will appear hereinafter and may be stated generally as consisting of the combinations of elements embodied in the claims hereto annexed and illustrated in the drawings forming part hereof wherein Figure 1 represents a front sectional elevation of a cambering machine or apparatus constructed in accordance with my invention; Fig. 2 is a vertical sectional view taken at right angles to Fig. 1; Fig. 3 is a plan view of the apparatus; Fig. 4 an enlarged detail in elevation of the cambering frames and templets shown in Fig. 1; Fig. 5 a sectional view corresponding to the line 5—5 of Fig. 4; Fig. 6 is a sectional detail illustrating an adjustable spring support which may be applied to the ends of the lower templet; Fig. 7 a detail in elevation of the cambering templets in operative relation to a spring plate; Fig. 8 is an enlarged detail showing a modified form of templet support, the parts being broken away; and Fig. 9 a sectional detail of the same corresponding to the line 9—9 of Fig. 8; and Fig. 10 an enlarged sectional detail through one of the adjusting devices for the upper templet.

Describing by reference character the various parts illustrated herein, 1 denotes a suitable supporting base, which may be a truck having wheels 2 by which it and the cambering apparatus thereupon may be transported along rails 3. 4 denotes a tank which is supported upon the truck frame. 5 denotes a standard, the base whereof is preferably located within the bottom of the tank. At its front, the standard is fashioned into a T-beam, indicated at 6, whereby a guide is formed for the lower or base member 7 on which one set of cambering templets is supported. This base member is shown as provided with flanges $7^a$ which are adapted to embrace the outer edges of the beam 6 whereby the base member 7 is guided in its vertical movement. The base 7 forms a support for two laterally spaced frames or grids which grids support therebetween the lower cambering templets. 8 and $8^a$ denote the sections of one grid or frame, the section 8 being longer than $8^a$ to accommodate longer templets and longer spring plates. Coöperating with the grid sections 8 and $8^a$ (which are shown as located at the front of the tank) is a vertical grid 9 which extends parallel with the first mentionel grid, the grid 8, $8^a$ and the grid 9 extending nearly the length of the tank. Each of the grids is provided with a base (see 10 and 11, Fig. 2) these bases being of such extent as to provide each a support for a lower templet, the templets (indicated at 12 and $12^a$) being adjustably supported from the bases 10 and 11, there being a space between said templets, for a purpose to be explained hereinafter. The upper ends of the grid frames 8, $8^a$, and 9 are preferably beveled outwardly, as shown at $8^b$ and $9^a$ (see Fig. 2). The templets 12 are located at the center of the machine while the templets $12^a$ are located on each side of the central templet. The central templets are of a length to accommodate the longest plates within the capacity of the machine while the templets $12^a$ are of such length as to accommodate shorter plates. The lower templets are shown as upwardly concave, the upper surface being formed by a plurality of transverse teeth or ribs 13 (see Figs. 6 and 7) having corresponding recesses or depressions 14 therebetween. The teeth are preferably of the shape shown in Figs. 6 and 7, being rack teeth, and the templets may, in fact, be formed from rack segments. The templets may be properly positioned with reference to the extended bases 10 and may be adjusted as to camber by means of the adjustable supports 38. These adjustable supports will be described in detail hereinafter. Coöperating with the lower frame (comprising the grids 8, 8$^a$, and 9) is an upper frame which is movable toward and from the other frame as well as jointly with the other (under circumstances to be explained hereinafter). This upper frame comprises a head 16 from which a sub or cross-head 17 may be suspended by means of bolts 18 having nuts 19 thereon. When the upper templets are out of operative relation to the lower templets, the nuts 19 will bear against the head 16. Springs 20 surround the bolts 18 and are interposed between the head 16 and the sub-head 17 whereby (under circumstances to be set forth hereinafter) a yielding pressure may be applied to the sub head by the head 16. A spring 21, interposed between the head 16 and sub-head 17, assists in this yielding transmission of pressure. The last mentioned spring, however, is mounted on a post 22 which, when the springs 20 and 21 have been compressed a certain distance, will be engaged by the head 16 and the attached parts. A screw 23 is provided which is connected to the head 16, which screw has a worm gear 24 threaded thereupon (see Fig. 3) driven by a worm 25, which in turn may be driven by pulleys 26 and 27 and a belt 28, the pulley 27 being driven by an electric motor 29. It will be evident that, by operating the motor, the worm gear 24 will be rotated.

The upper spring-cambering templets are indicated at 30 and 30$^a$ (see Fig. 4) and are supported from a pair of grids 31 secured to and depending from the sub-head 17. These grids are vertically slotted, and the upper templets may be secured to the outer faces of the grids in the manner shown in the drawing. The central portions of the upper templets may be adjustably suspended from the grids by means of bolts 31$^a$. These bolts may extend each through the body of a templet thereby to support the same and may be adjustably connected to the upper frame, as by nuts 32.

Reference has been made hereinbefore to the fact that the templets are adjustably supported. In the case of the lower templets, the central portion may be supported by means of a bolt 12$^c$ projecting upwardly from the base 10 or 11. The end portions are preferably supported by means of blocks 38 (shown as circular in the drawings) mounted on studs 39 (see Figs. 4 and 5) which may project through the vertical space provided between any pair of grid bars and be clamped in position by means of a nut 40. This permits the adjustment of the blocks or supports 38. As the templets will be subjected to severe pressure during the cambering operation, each block is reinforced by means of a jack consisting of a bolt 41 having its end threaded through a nut 42 which is adapted to rest upon the base 10 or 11 (as the case may be), the upper end of the jack bolt bearing against the block. For convenience of adjustment, the intermediate portion of each bolt is squared, as shown at 41$^a$, for the application of a wrench.

The upper templets are also provided with blocks adapted to bear against the upper surfaces of the templets and adjacent to the outer ends thereof. These blocks are constructed and supported in the same manner as the blocks just described and are designated by like numerals. These blocks will also be reinforced by jacks, similar to those just described in connection with the lower templets except that their position is reversed, the nuts bearing against the downwardly projecting flanges of the upper grid sections 31. The jacks are designated by reference characters identical with those employed in connection with the lower templets.

It will be noted that the grids 31 are comparatively close together, as compared with the grids 8. In fact, the lower ends of the grids 31 are beveled, whereby they may enter the space between the templets 12, the distance between the outer faces of the grids 31 being such that, should the plates on the templets 12 project beyond the inner edges of such templets, they will be automatically spread apart and properly positioned on their respective templets, the beveling of the lower ends of the grids 31 facilitating this operation.

The lower cambering frame section is suspended by means of chains 43 which are connected thereto and extend upwardly around pulleys 44, thence inwardly and rearwardly over pulleys 45, thence downwardly to the bottom weight 46 of the series of weights indicated at 46$^a$, the lower weight 46 being shown as supported by a spring 47.

In connection with the rack segments or templets, I may employ a yielding support for the chamfered ends of spring plates. As is well known, irregularities are apt to happen to and also necessarily exist in the thickness of the plate ends which have been so treated. In order to accommodate these irregularities and at the same time insure the proper cambering of the plates having such chamfered ends, I employ a yielding support for such ends, preferably carried by the lower templets. As shown in Fig. 6, this yielding or spring support is secured by means of a plunger rod 48 which is movable through an opening in the templets and has a head 49 adapted to engage the end of the spring plate. The lower end of the rod 48 is connected to a spring 50 which extends beneath the templet and through the head 51 of a stud which is threaded into the base of the templet, the stud aperture being rounded, as shown at 52, to provide a rocking support for the spring. The end of the spring which projects through and beyond the head 51 may extend into a slot within the head 53 of another stud which is threaded into the templet, whereby such end is supported.

Reference has been made to the fact that the transverse teeth or ribs 13 on the templets may be rack teeth. In this connection attention is invited to the fact (see Fig. 7) that the distance between adjacent edges of consecutive rack teeth is no greater and preferably equal to the thickness of the interposed plate 54 which is to be cambered. It has been found that this not only permits the proper circulation of the quenching liquid in contact with the plate but also prevents the crumpling or distorting of the fiber of the plate during the cambering and quenching operation.

In order to prevent overheating the quenching liquid (preferably oil) within the tank 4, the radiator 55 is provided through which a cooling fluid may be circulated, thereby to prevent undue heating and variations in the temperature of the quenching liquid.

Attention is invited to the receptacle or basin 56 shown in Fig. 2. It will be observed that this basin is located above the surface of the quenching liquid and between the same and the top or cover 57; also to the fact that only a sufficient portion of the reservoir is left uncovered to permit of the operation of the cambering mechanism. This receptacle or basin 56 is provided with two liquid supply connections one indicated at 58 and the other at 59. It is contemplated supplying to this basin liquid such as, when mingled, will evolve a mass of fine bubbles containing fire extinguishing fluid, which bubbles will be spread upon the top of the quenching liquid and will in effect seal the opening provided for the cambering mechanism whereby it will be impossible for the quenching oil to "flash" or any flames to be produced which might endanger the operator and injure the apparatus and factory in which it is located. For the purpose of producing this result, a solution of alum may be supplied through one of the connections and a solution of a carbonate (as sodium carbonate) may be supplied through the other connection. One or the other of these solutions may have added thereto a sufficient quantity of licorice solution or infusion (such as is used in tobacco manufacture) to impart the necessary strength and elasticity to the bubble walls to prevent their untimely rupture. By mingling the liquids, bubbles of $CO_2$ will be evolved and these bubbles will be evolved in such quantity as to form a mass which will cover the entire surface of the oil and the opening at the front of the tank thereby to form a self-perpetuating seal between the external air and the upper surface of the oil which seal is of itself a fire extinguisher.

The operation of the motor 29 is controlled through a "two-way" electric switch 60 which is supported in convenient reach of the operator, by brackets 61, from the underneath side of the casing 62 which contains the worm wheel and worm 24 and 25, respectively. The wiring between the motor and the switch is such that when the switch is thrown in one direction it will rotate the motor to elevate the head of the cambering machine, and when thrown in the other direction will reverse the motor and cause the head to move downward. It is thought unnecessary to illustrate and describe in detail the system of wiring for the purpose of accomplishing the above result, since the same is a matter of common knowledge to those skilled in the art of electricity. Shown clearly in Fig. 2, are two electric switches 63 and 64, which are supported upon suitable brackets that project from the side of the standard 5 and in a position to have their operating handles engaged and moved by stops 65 and 66, respectively, which are carried by the vertically movable head of the machine. These switches are moved to closed position by a spring 67, which is common to both and which is connected to their operating handles by chains 68. The switch 63 is included in a circuit which causes the motor to rotate in a direction to elevate the head of the machine, and the switch 64 is in that circuit which causes the motor to rotate in the opposite direction. It will be seen, therefore, that when the operator closes the switch 60 to cause the press to operate, the movement of the machine will, through one of its stops, open the appropriate switch to cause the electric circuit to be broken and the motor stopped, whereby the operation of the machine will be suspended until the operator reverses the switch 60.

The operation of the apparatus is briefly as follows: The plates to be cambered are applied to the lower templets. The switch 60 is closed and the motor then operates to move the upper cambering head or frame downwardly and bring the upper templets against the plates suported upon the lower templets. When the templets are "engaged" (which is when the plates have been bent to shape) further rotation of the screw 23 will, for a time, produce merely a yielding pressure upon the spring plates, this yielding pressure being permitted by the spring 20 and 21. Further downward movement of the head 16 will, however, cause it to impinge against the top of the bolt or stud 22. The weights 46, 46ª will act in opposition to the descent of the cambering frame members, which will subject the plates to an increased clamping action between the templets and will cause the interposed spring plates to be clamped more firmly between the templets. The rotation of the screw 23 will, however, carry both cambering frame members downwardly against the resistance of the counterbalancing weights 46, 46ª and into the quenching liquid. At this instant the mechanical operation of the apparatus will be stopped by the opening of the switch 64. When the quenching operation has proceeded a sufficient length of time, the motor will be reversed, as by the switch 60, and the upper member of the cambering frame will be lifted, thereby relieving the pressure upon the lower frame, which will be elevated by the weights 46, 46ª. When the parts are restored to the position shown in Fig. 2 the plates will be removed and the operation repeated.

In Figs. 8 and 9 there is shown a modification of a cambering frame and templet supporting means described hereinbefore. 71 denotes the upper cambering frame member and 72 the supporting base. Each upper templet may be conveniently supported from the upper frame by means of an exteriorly threaded tubular member 33 having at its lower end a head 34 adapted to bear against the upper surface of the templet 30, there being a bolt 35 extending through the tubular member 33 and through the templet 30 and having at its lower end a cross head 35ª adapted to fit within the space between adjacent teeth 30ª of the templet. This bolt extends upwardly through the tubular member or sleeve 33 and may be supported from said member or sleeve in any convenient manner, as by means of a wing nut 36, see Fig. 7. Nuts 37 threaded on the exterior surface of the sleeve 33 form adjustable means for supporting the sleeve or tubular member and associated parts from the frame 71. Two pairs of open or grid work guideways are provided for the two transverse series of lower templets (see Fig. 9). These vertically extending grids or guideways are indicated at 73 and the space between each pair is of such width as to receive snugly therewithin a low templet 12. These templets may be supported by jacks and rollers in the same manner as in the preceding modification, two of the jack bolts being indicated at 74. In the operation referred to hereinbefore each spring plate, having been heated to the necessary temperature, is cambered by having its opposite surface engaged simultaneously at a plurality of separated but closely spaced points or lines of contact. Furthermore the pressure which is exerted upon each plate to camber the same is a yielding pressure and one which increases from a minimum to the desired maximum, which maximum pressure is attained when the lower cambering frame or head begins its descent. The plates, as soon as subjected to proper pressure, are conducted through an air or oxygen excluding medium (the layer of bubble formation on top of the oil) and into the quenching liquid. The manner of clamping the spring plates between the cambering elements insures the effectual cooling or quenching of the plates and at the same time prevents any fiber distortion.

The apparatus shown herein is of great importance in securing the proper heat treatment of the steel plates for the following reasons:—

(a) The steel may be held under a fixed pressure during the entire period of time occupied in passing from above to across and below decalescence.

(b) Because of the removable counterweights, this pressure may be adjusted to the requirements of the particular grade and thickness or gage of steel that may be treated at any particular time, whereby provision is made for accommodating and permitting the wave-like and other movements which occur in the plates while crossing decalescence—due to local differences in the then condition of the steel—but without relaxing the pressure (applied to the plate as a whole) necessary to offset the local stresses which are due to the bending or cambering of the same. This results in the production of tempered plates which are unwarped and untwisted, which are free from waves and other irregularities, and which are substantially homogeneous throughout their extent.

(c) The employment of the spring bumper or buffer between the motor-driven head 16 and the upper cambering frame or templet enables me to give to the steel plate a hammer blow that is extremely desirable, but without indenting the metal and without subjecting the same to destructive shock; it also enables me to use a continuously operating motor without injury thereto. Finally, and very importantly, it coöperates with the counterweights applied to the opposite templet or frame to accommodate the snake-like or wave-like contortions of the plate while crossing decalescence. Rigidly clamping a plate between the templets will result in an uneven, or "humped", or wavy quenched plate.

(d) The clamping of the plates between the spaced lines allow them to take up new positions between these lines as the plates cross decalescence and thus assists in the production of a plate free from humps or waves.

While I have necessarily described in detail the embodiment of my invention illustrated herein, I do not thereby intend to be limited to such details except as the same may be positively included in the claims hereto annexed or their inclusion be rendered necessary by the state of the prior art.

Having thus described my invention what I claim is:

1. In a machine of the character set forth, the combination of a frame having laterally spaced vertically projecting grids, a pair of cambering templets in the space between said grids and each being supported adjacent to a grid and being themselves laterally spaced, a second frame having a pair of grids adapted to enter the space between the said cambering members and to substantially contact with the opposed inner edges of said members, a pair of cambering members complementary to the first mentioned members and carried by the second frame outside of the grids thereof, and means for moving one of said frames toward and from the other.

2. In a machine of the character set forth, the combination of a frame having laterally spaced vertically projecting grids, a pair of cambering templets in the space between said grids and each being supported adjacent to a grid and being laterally spaced, a second frame having a pair of grids adapted to enter the space between the said cambering members and to substantially contact with the opposed inner edges of said members, a pair of cambering members complementary to the first mentioned members and carried by the second frame outside of the grids thereof, the ends of the second grid being beveled to facilitate the outward displacement of the plates on the first mentioned cambering members, and means for moving one of said frames toward and from the other.

3. In a machine of the character set forth, the combination of a pair of opposed frames each having a base, a cambering member associated with each frame, and a plurality of longitudinally spaced members adjustably mounted on each base and adapted to support a cambering member therefrom.

4. In a machine of the character set forth, the combination of a pair of opposed members adapted to clamp a plate therebetween to camber the same, and means associated with one of said members whereby the space between the end portions of the members may be varied.

5. In a machine of the character set forth, the combination of a pair of cambering members each having a series of transverse teeth or corrugations, means associated with opposite ends of one of said members and adapted to engage the ends of an interposed plate, and a yielding support for such plate engaging means.

6. In a machine of the character set forth, the combination of a lower frame member, a non-yieldable cambering templet thereon, an upper frame member, a complementary non-yieldable cambering templet thereon, an operating head for the upper member, a yielding connection between said head and the upper cambering templet, a plurality of removable counterweights connected with the lower frame and tending to elevate the same, and a liquid containing tank arranged beneath the lower frame.

7. In a machine of the character set forth, the combination of an upper frame, a non-yieldable cambering templet supported thereby, a head, and a yielding connection between said head and said frame, power operated means for raising and lowering said head, a lower frame, a non-yieldable cambering templet carried thereby, and removable weights operatively connected with the lower frame and tending to elevate the same, and a quenching tank arranged beneath the second frame.

8. In a machine of the character set forth, the combination of a quenching tank, a frame, removable weights connected thereto and arranged to hold the same above the liquid in the tank, a plurality of non-yieldable cambering templets carried by said frame, a second frame mounted above the first frame, a plurality of non-yieldable cambering templets carried by the second frame, driving mechanism for raising and lowering the second frame, and a spring interposed between said mechanism and said frame.

9. In a machine of the character set forth, the combination of a tank, a reciprocating element, a continuously operable motor for reciprocating said element, a templet, a resilient device operatively interposed between said element and said templet, a complementary templet located below the first mentioned templet, and removable counterweights connected with the second templet and normally holding the same above the liquid in the tank and serving to apply a definite pressure against the plate interposed between said templets.

10. In a machine of the character set forth, the combination of a rigid templet, means for reciprocating the same, a yielding connection interposed between said means and said templet, a second rigid templet complementary to the first mentioned rigid templet and adapted to be moved by the movement of the first mentioned templet, together with an interposed plate, into and out of a quenching liquid, means connected to the last mentioned templet whereby fixed pressure may be maintained by said templets upon the interposed plate during the reciprocatory movement of the templets into and out of the quenching liquid, and means whereby the aforesaid pressure may be varied.

11. In a machine of the character set forth, the combination of a continuously operable motor, a member connected thereto and reciprocable thereby, a rigid cambering templet, one or more springs interposed between said member and said templet, a second rigid cambering templet complementary to the first mentioned templet, a supply of quenching liquid, and removable adjustable counterweights connected with the second templet and tending to maintain the same away from such supply, the said liquid supply being located within the path of movement of said templets and an interposed plate.

12. The combination, with a pair of suitably shaped opposed non-yieldable cambering templets, of means for moving one of said templets toward and from the other and into engagement with a plate interposed therebetween, a continuously operative yielding connection between said means and the first mentioned templet, means associated with the second templet to maintain a constant pressure upon the interposed plate, means for quenching or cooling the plate while thus clamped between said templets, and means whereby the pressure exerted between the templets may be varied to accommodate the requirements of any particular plate that may be cambered.

13. The combination, with a liquid-containing tank, of an anvil member reciprocable toward and from the liquid in said tank, a non-yieldable templet carried by said member, removable counter-weights connected to said member and normally serving to support the same with the templet above the level of the liquid in said tank, a hammer member, a non-yieldable templet carried thereby, means for moving the hammer member toward and from the anvil member and for imparting to the hammer member a stroke of sufficient length to carry the templets and the plate interposed therebetween beneath the surface of the liquid in the tank and a continuously operative yielding device interposed between one of said members and its templet, whereby the blow struck by the anvil upon the interposed plate will be cushioned and the said plate permitted to adjust itself between said templets to accommodate the movements of said plate due to temperature changes.

14. In a machine of the character described, the combination, with a supply of quenching liquid, of an anvil member reciprocable toward and from the liquid supply, a non-yieldable templet carried by said member, removable counter-weights connected to said member and normally serving to support the same with the templet out of operative relation to the quenching liquid, a hammer member, a non-yieldable templet carried thereby, an electric motor for driving the hammer member, a yielding device interposed between said motor and the hammer member, an electric circuit including said motor, a reversing switch in said circuit, and switches arranged to be alternately opened and closed by one of said members when the said member shall have been moved a predetermined distance in opposite directions by said motor.

15. In a machine of the character described, the combination, with a supply of quenching liquid, of an anvil member reciprocable toward and from the liquid supply, a non-yieldable templet carried by said member, removable counter-weights connected to said member and normally serving to support the same with the templet out of operative relation to the quenching liquid, a hammer member, a non-yieldable templet carried thereby, an electric motor for driving the hammer member, a yielding device interposed between said motor and the hammer member, an electric circuit including said motor, a reversing switch in said circuit, and switches arranged to be alternately opened and closed by the hammer member when said members shall have been moved a predetermined distance in opposite directions by said motor.

In testimony whereof, I hereunto affix my signature in the presence of two witnesses.

THOMAS J. FAY.

Witnesses:
 HERBERT S. JANDUS,
 H. W. STEINER.